United States Patent [19]

Blackburn

[11] Patent Number: 5,729,112
[45] Date of Patent: Mar. 17, 1998

[54] PHASE CURRENT SENSING IN A BIFILAR-WOUND SWITCHED RELUCTANCE MOTOR DRIVE TOPOLOGY

[75] Inventor: Scott E. Blackburn, Temperance, Mich.

[73] Assignee: Dana Corporation, Toledo, Ohio

[21] Appl. No.: 693,820

[22] Filed: Jul. 26, 1996

[51] Int. Cl.⁶ ........................................... H02K 29/02
[52] U.S. Cl. ................. 318/701; 318/685; 318/138; 318/254; 318/696
[58] Field of Search ........................ 318/138, 139, 318/245, 254, 439, 701, 696, 685

[56] References Cited

U.S. PATENT DOCUMENTS

| | | |
|---|---|---|
| 3,679,953 | 7/1972 | Bedford . |
| 3,906,320 | 9/1975 | Doemen ................. 318/331 |
| 4,112,345 | 9/1978 | Goddijn ................. 318/696 |
| 4,117,364 | 9/1978 | Baker . |
| 4,223,260 | 9/1980 | Beer et al. ............. 318/696 |
| 4,336,484 | 6/1982 | Marinko ................. 318/696 |
| 4,500,824 | 2/1985 | Miller .................... 318/701 |
| 4,556,836 | 12/1985 | Antognini ............. 318/696 |
| 4,616,165 | 10/1986 | Compter ................ 318/701 |
| 4,644,234 | 2/1987 | Nola . |
| 4,677,356 | 6/1987 | Tsuneda et al. . |
| 4,731,570 | 3/1988 | Lee ....................... 318/696 |
| 4,739,240 | 4/1988 | MacMinn et al. . |
| 4,760,315 | 7/1988 | Nanae et al. . |
| 5,103,151 | 4/1992 | Kondo et al. .......... 318/696 |
| 5,134,682 | 7/1992 | Muller . |
| 5,177,416 | 1/1993 | Inaji et al. . |
| 5,268,623 | 12/1993 | Muller ................... 318/434 |
| 5,384,527 | 1/1995 | Rozman et al. . |
| 5,418,436 | 5/1995 | Apuzzo .................. 318/497 |
| 5,548,196 | 8/1996 | Lim ....................... 318/701 |

FOREIGN PATENT DOCUMENTS

| | | |
|---|---|---|
| 91630021 | 4/1991 | European Pat. Off. . |
| 2105932 | 9/1981 | United Kingdom . |
| 81/00183 | 9/1981 | WIPO . |

*Primary Examiner*—Paul Ip
*Attorney, Agent, or Firm*—Dykema Gossett PLLC

[57] ABSTRACT

A phase current sensing apparatus is disclosed for use in a bifilar-wound switched reluctance motor drive topology. The phase winding includes a primary coil, and a secondary coil. A power switch is connected in-series with the primary coil, and a common node, which common node is further connected to ground by way of a resistive shunt. The other end of the primary coil is tied to a positive bus of a power supply. The secondary coil, which is oppositely wound relative to the primary coil, has one end tied to the positive bus, and the other end tied to a cathode terminal of a diode. An anode terminal of the diode is tied to the common node. A non-inverting amplifier, and an inverting amplifier are provided and each is responsive to the voltage developed on the common node. The non-inverting amplifier generates a first signal $S_1$ that is indicative of a primary coil current. The inverting amplifier generates a second signal $S_2$ that is indicative of a secondary coil current. Each of the first, and second signals $S_1$, and $S_2$ are of a positive-polarity. An analog switch is provided, and is controlled by a phase commutation signal that controls the energizing switch, to select one of $S_1$ and $S_2$. The output of the analog switch is continuous, and of positive-polarity.

12 Claims, 2 Drawing Sheets

PHASE CURRENT SENSING IN A BIFILAR-WOUND SWITCHED RELUCTANCE MOTOR DRIVE TOPOLOGY

BACKGROUND OF THE INVENTION

1. Technical Field

This invention relates generally to a system for phase current sensing in a switched reluctance motor (SRM), and, more particularly, to such a system for use in a bifilar-wound motor drive topology in order to provide a continuous phase current signal representative of the current through a phase winding.

2. Discussion of the Related Art

Switched Reluctance Machines (SRM) have the been the subject of increased investigation of late due to their many advantages, which makes them suitable for use in a wide variety of applications. An SR machine, or motor, operates on the basis of varying reluctance in its several magnetic circuits. In particular, such motors are generally doubly salient motors—that is, they have poles or teeth on both the stator and the rotor. The stator teeth have windings disposed thereabout which form machine phases of the motor. In a common configuration, stator windings on diametrically opposite poles are connected in series to form one machine phase. In the alternative, such windings may be also connected in parallel. A particular drive topology for SR motors involves the use of a so-called bifilar winding, which includes a primary coil, and a secondary coil. The primary coil may carry current during an energization interval, while the secondary coil carries current when current through the primary coil is interrupted, such as by turning off a semiconductor switch used to energize the primary coil.

When a phase winding is energized, the closest rotor pole pair is attracted towards the stator pole pair having the energized phase winding, thus minimizing the reluctance of that magnetic path. By energizing consecutive phase windings (i.e., machine or motor phases) in succession, in cyclical fashion, it is possible to develop torque, and thus rotation of the rotor in either a clockwise, or counter-clockwise direction.

One operating parameter whose availability is generally recognized in the art as being desirable for efficient control of a switched reluctance motor is an angular position of the rotor, relative to the stator. Another parameter is a phase winding current magnitude of an energized phase winding. A problem in the art relates to determining this phase current parameter. In particular, although the magnetic flux generated in a bifilar-wound topology may typically be positive (due to the fact that the primary coil, and the secondary coil, are wound in an opposite manner), the currents running through each coil are opposite in polarity. Therefore, commutation control circuits have had difficulty in directly using the phase current information, especially during the period in which current flow is through the secondary coil. The conventional phase current information is thus not discontinuously available.

Accordingly, there is a need to provide for an improved phase current sensing scheme that minimizes or eliminates one or more problems as set forth above.

SUMMARY OF THE INVENTION

The present invention provides for a substantially continuous phase current signal that is representative of the magnitude of the phase current. Access to such continuous signal provides the capability for a controller controlling the operation of the SR motor to make better commutation decisions. Improved commutation decisions result in a more desirable operation of the motor (e.g., improved efficiency).

This invention is directed to an apparatus for use in a switched reluctance motor employing a bifilar phase winding having a primary coil, and a secondary coil. The apparatus is configured for generating a phase current signal representative of a phase current, and includes three major elements. The first element comprises a structure or means for generating a first signal indicative of a primary coil current. The second major element comprises a structure or means for generating a second signal indicative of a secondary coil current. Finally, the third element includes a structure or means for generating the phase current signal using the first and second signals. The generated phase current signal is substantially continuous, and is of a positive polarity, to thereby provide for improved phase commutation of the SR motor.

In a preferred embodiment, the primary coil has a first end connected to a positive power supply, while its second end is connected to an energizing switch. The other end of the switch is connected to a common node, which is further connected to ground by way of a resistive shunt. The switch is controlled, through a control terminal thereof, by a phase commutation signal. The secondary coil also has one end connected to the positive power supply, and has its second end connected to the common node by way of a back diode. A non-inverting amplifier, and an inverting amplifier, are also provided, and each includes an input terminal thereof coupled to the common node. The two amplifiers each include an output terminal thereof that is connected to an analog switch, which includes a pair of inputs, and an output. The analog switch transfers the above-mentioned first signal, which is generated by the non-inverting amplifier, to the analog switch output when the phase commutation signal is active. The second signal, which is output from the inverting amplifier, is transferred to the analog switch output when the phase commutation signal is inactive. In operation, the current through the primary coil generates a positive polarity signal on the common node by way of the resistive shunt. Current through the secondary coil, which occurs when the primary coil current is interrupted, generates a negative polarity signal on the common node, also due to the resistive shunt. The inverting amplifier is operative to, in effect, rectify the negative-polarity portion of the signal on the common node. Control of the analog switch to select one of its two inputs provides for a continuous, and positive polarity phase current signal, which may be provided to a controller for operation of the motor.

These and other features and objects of this invention will become apparent to one skilled in the art from the following detailed description and the accompanying drawings illustrating features of this invention by way of example, but not by way of limitation.

DETAILED DESCRIPTION OF THE PREFERRED EMBODIMENTS

Figure 1:
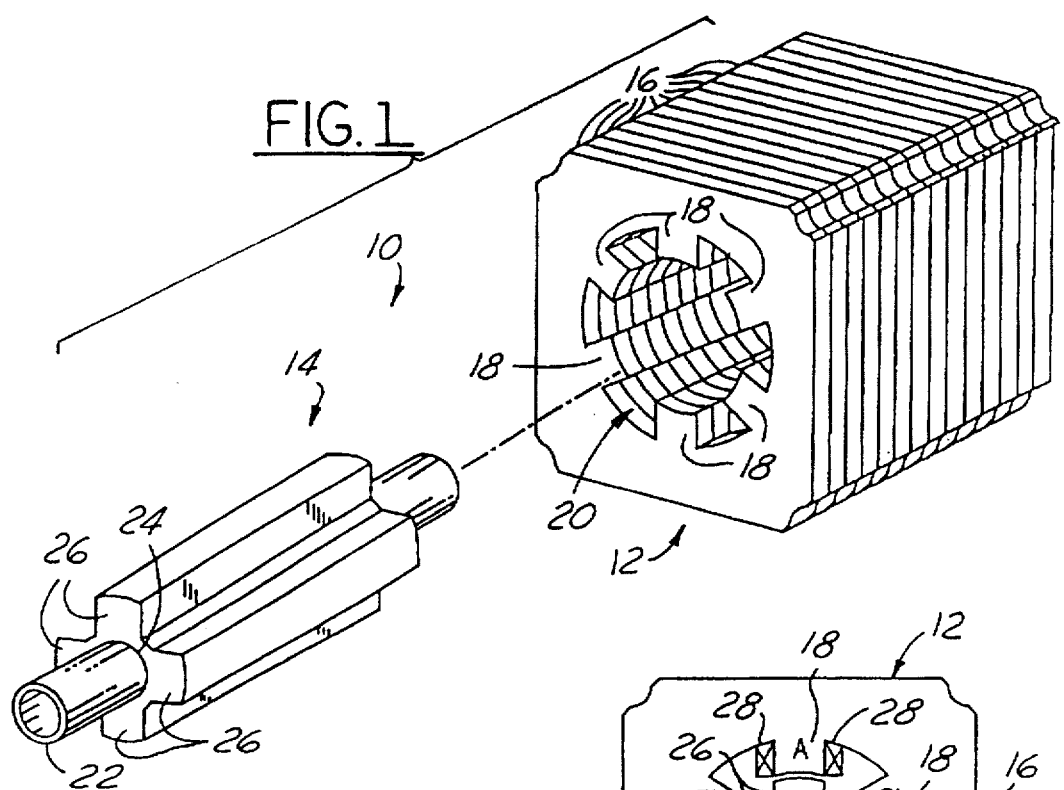
FIG. 1 is an exploded, perspective view of a portion of a switched reluctance electric motor suitable for use in connection with a preferred embodiment of the present invention.

Referring now to the drawings wherein like reference numerals are used to identify identical components in the various views, FIG. 1 shows the major mechanical components of a switched reluctance (SR) electric motor 10, which includes a stator assembly 12, and a rotor assembly 14.

Although the invention will be described and illustrated in the context of a switched reluctance electric motor 10, it will be appreciated that this invention may be used in conjunction with other well-known electric motor structures. Stator assembly 12, in a preferred embodiment, comprises a plurality of laminations 16. The laminations 16 are formed using a magnetically permeable material, such as iron.

Stator assembly 12 is generally hollow and cylindrical in shape. A plurality of radially, inwardly extending poles 18 are formed on stator assembly 12 (via laminations 16) and extend throughout the length thereof. Poles 18 are preferably provided in diametrically opposed pairs. Although the illustrated embodiment shows six poles 18 (i.e., three stator pole pairs), it should be appreciated that a greater or lesser number of poles 18 may be provided in any particular configuration.

Each of the poles 18 may have a generally rectangular shape, when taken in cross-section. The radially innermost surfaces of the poles 18 are slightly curved so as to define an inner diameter representing a central bore 20. Bore 20 is adapted in size to receive rotor assembly 14.

Rotor assembly 14, when assembled into stator 12 (see FIG. 2) is coaxially supported within stator assembly 12 for relative rotational movement by conventional means. For purposes of description only, rotor assembly 14 may be supported by conventional bearings (not illustrated) mounted in conventional housings (not shown) secured to the longitudinal ends of stator assembly 12. Rotor assembly 14 includes a generally cylindrical shaft 22, and rotor body 24. Shaft 22 may be hollow, as illustrated. Rotor body 24 is secured to shaft 22 for rotation therewith. For example, rotor body 24 may be secured to shaft 22 by means of a spline (not shown), or other conventional means well-known in the art. Thus, it should be appreciated that shaft 22, and rotor body 24 rotate together as a unit.

Rotor body 24 includes a plurality of poles 26 formed on an outer surface thereof. Each pole 26 extends radially outwardly from the outer surface and is formed having a generally rectangular shape, when taken in cross-section. Rotor poles 26 extend longitudinally throughout the entire length of the outer surface of rotor body 24. The radially outermost surface of rotor poles 26 are curved so as to define an outer diameter, adapted in size to be received within the inner diameter defining central bore 20. That is, the outer diameter formed by poles 26 is slightly smaller than the inner diameter defined by the radially innermost curved surfaces of stator poles 18. Rotor poles 26 are also preferably provided in diametrically opposed pairs. Although four (4) rotor poles 26 are provided on the illustrated rotor assembly 14, it should be appreciated that a greater or lesser number of rotor poles 26 may be used in any particular configuration. For SR motors, in general, the number of rotor poles 26 differs from the number of stator poles 18, as is well-known. Rotor body 24, including poles 26, may be formed from a magnetically permeable material, such as iron.

Figure 2:
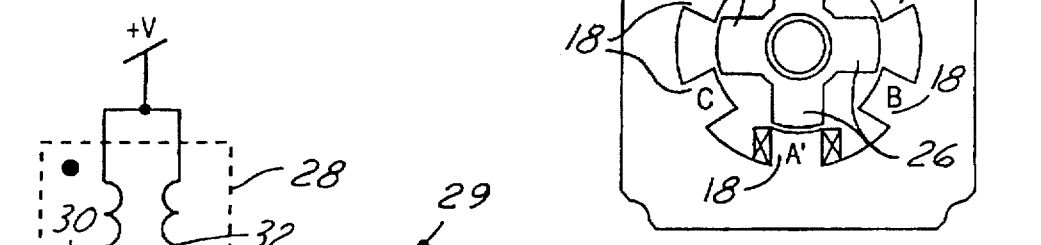
FIG. 2 is a diagrammatic, exaggerated cross-sectional view of a switched reluctance electric motor illustrating the relative positions of a stator, and a rotor portion thereof.

Referring now to FIG. 2, a diagrammatic view of a cross-section of an assembled motor 10 is illustrated. In particular, as referred to above, poles 18 occur in pairs: (i.e., AA', BB', and CC'). The rotor poles 26 also appear in pairs. Stator windings 28 (shown only on stator pole pair AA' for clarity) of diametrically opposite poles associated with stator assembly 12 may be connected in series to form one machine phase. Thus, the windings 28 on poles AA' are referred to as "machine or motor phase A" of SR motor 10. In the illustrated example, SR motor 10 also has a machine phase B, and a machine phase C. Each of three machine phases may be energized individually, which, when done in a controlled manner according to certain parametric information, provides for rotation of rotor body 24, and thus, an output torque on shaft 22. Although a three-phase motor is described and illustrated, any motor having one or more motor phases is contemplated as falling within the spirit and scope of this invention. For example, four-phase motors are also contemplated as within the spirit and scope of this invention.

Although the description to be set forth below makes reference to only a single motor phase, it should be understood by those of ordinary skill in the art that all phases of motor 10 may be identically treated in accordance with the described embodiment.

Figure 3:
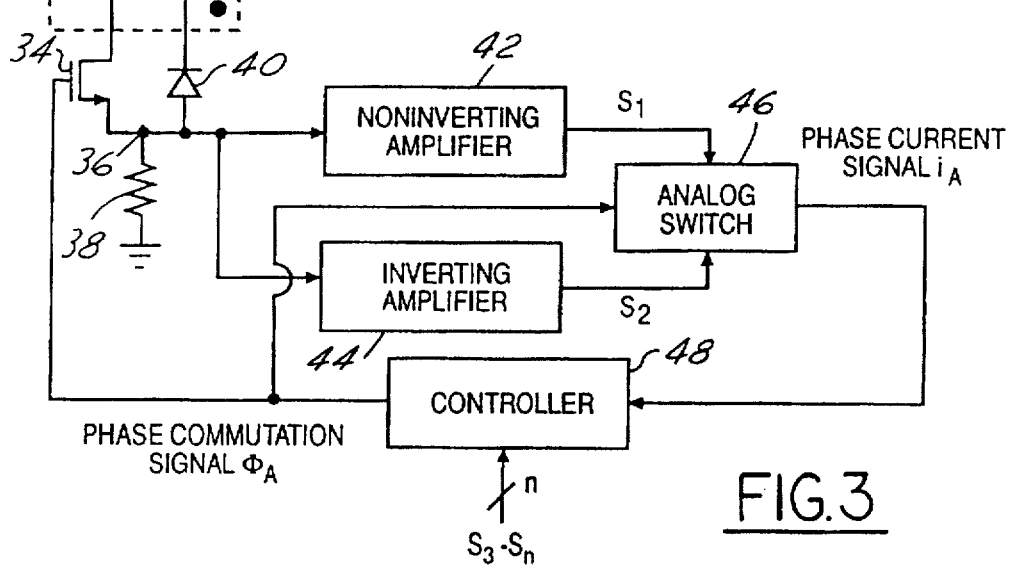
FIG. 3 is a simplified, block and schematic diagram view showing a preferred phase sensing embodiment according to the present invention.

FIG. 3 shows a phase sensing apparatus 29 for generating a phase current signal $i_A$ representative of a phase current flowing through stator winding 28. The phase sensing circuit 29 is adapted to be used with a bifilar phase winding 28 comprising a primary coil 30, and a secondary coil 32, and includes an energizing switch 34, a common node 36, a resistive element 38, a diode 40, a non-inverting amplifier 42, an inverting amplifier 44, a circuit or means, such as an analog switch 46, for generating the phase current signal $i_A$, and a controller 48.

Bifilar phase winding 28 includes a primary coil 30, and secondary coil 32. Primary coil 30, and secondary coil 32 are wound in an opposite orientation, as indicated by the oppositely oriented dotted terminals on the respective coils. A first end or terminal of primary coil 30 (i.e., the dotted terminal) is connected to a positive bus of a power supply which produces a voltage level of +V. A first end of secondary coil 32 (i.e., the non-dotted terminal) is also connected to the positive bus. Thus, coils 30, and 32 share a common end connected to the positive bus.

Energizing switch 34 is provided for energizing winding 28, and in particular primary coil 30. Switch 34 may be, in a preferred embodiment, an n-channel enhancement type field effect transistor 34. Transistor 34 includes a drain terminal connected to a second end (i.e., the non-dotted terminal) of primary coil 30, and a source terminal connected to common node 36. The transistor 34 further includes a control terminal responsive to a phase commutation signal $\phi_A$ for causing transistor 34 to turn ON, and OFF, according to well-known and conventional characteristics of such switches. Resistive element 38 provides a path from common node 36 to a ground node. This path permits current flow through primary coil 30 when switch 34 is closed. When such a forward current flows through primary coil 30, a positive polarity signal is developed at node 36 due to the voltage drop developed across resistive element Diode 40 is provided for substantially inhibiting current flow from the positive bus of the power supply to node 36 to ground by way of secondary coil 32. Diode 40 is conventional, and well-known in the art. The orientation of diode 40, (i.e., a cathode terminal connected to coil 32, and an anode terminal connected to common node 36), however, permits a back current to flow from the ground node, through resistive element 38, and through diode 40 and secondary coil 32 to the positive bus of the power supply. It should be appreciated that when such a back current flows, a negative-polarity signal is developed on node 36.

Non-inverting amplifier 42 is provided for generating a first signal $S_1$ on an output terminal thereof, using the signal developed on common node 36 applied to its input terminal. Signal $S_1$ is indicative of a primary coil current (i.e., a current level or magnitude flowing through coil 30). Specifically, non-inverting amplifier 42 operates to buffer or pass a positive-polarity portion of the signal developed on common node 36, while effectively becoming nonresponsive (i.e., generating a zero volt signal output) for any input signal that is of a negative polarity. Non-inverting amplifier 42 having the characteristics described above is well-known and conventional in the art.

Inverting amplifier 44 is provided for generating a second signal $S_2$ on its output terminal thereof, signal $S_2$ being indicative of a current level or magnitude flowing through secondary coil 32. Inverting amplifier 44 operates to invert a negative-polarity signal on its input terminal to generate second signal $S_2$. Amplifier 44 is effectively nonresponsive, as that description is used above, to positive-polarity signals applied to its input terminal (which is directly connected to common node 36). Such an amplifier 44 is well-known, and conventional in the art.

Resistive element 38, and non-inverting amplifier 42 thus form the means for generating first signal $S_1$, which is representative of a primary coil current flowing through primary coil 30. Resistive element 38, and inverting amplifier 44 thus also form the means or structure for generating second signal $S_2$, which is representative of a secondary coil current through secondary coil 32. These structures convert a current to a voltage signal, then subsequently process this voltage signal to develop $S_1$ and $S_2$.

Analog switch 46 provides a structure or means for generating phase current signal $i_A$ by toggling between signals $S_1$, and $S_2$. Switch 46 includes a selection terminal thereof that is responsive to the phase commutation signal $\phi_A$. When the phase commutation signal is in an active state (a high logic state in the illustrated embodiment), switch 46 is operative to connect signal $S_1$ to an output terminal thereof to generate phase current signal $i_A$. This control provides correspondence between the phase current signal output, and the input ($S_1$), since when $\phi_A$ is active, switch 34 is "ON" and a positive current is developed in coil 30.

When the phase commutation signal is in an inactive state, (a low logic state in the illustrated embodiment), switch 46 is operative to connect signal $S_2$ to its output terminal to generate the phase current signal $i_A$. This also provides correspondence between $i_A$, and the signal used to form it ($S_2$), since switch 34 is "OFF", and current flows, for a certain time, through coil 32.

Controller 48 is provided for, among other things, generating phase commutation signal $\phi_A$. Controller 48 performs this function using parametric information, such as phase current signal $i_A$, as an input, in addition to one or more additional input signals indicated at $S_3$–$S_n$. The art is replete with various control strategies and systems employing same for generating phase commutation signals. For example, in a so-called hysteresis current control system, the phase commutation signal is pulse width modulated to maintain the current level through winding 28 at a substantially nominal value for a predetermined interval related to an angular position of rotor 14. Use of an embodiment according to this invention wherein the phase current signal $i_A$ is continuous, and of positive-polarity, permits improved generation of the phase commutation signal. Specifically, while current through winding 28 increases, the current level is monitored to determine when to open switch 34 by deactivating $\phi_A$. Continuous phase current information provides for better decisions by controller 48. Controller 48 is otherwise well-known in the art for purposes of describing the present invention.

Referring now to FIGS. 4A–4E, a description of the operation of an embodiment according to the present invention will now be set forth in detail. It should be appreciated, that the components of circuitry 29 are required for each phase of the motor drive topology, except for controller 48, which may be common to all of the motor phases and, of course, bifilar winding 28, which will be unique to each motor phase.

Figure 4A:
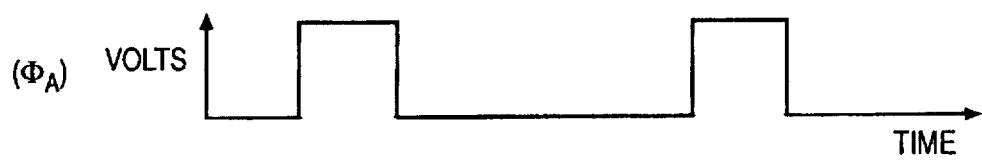
FIGS. 4A–4E are simplified, timing chart diagrams showing various signals taken at various nodes in the schematic and block diagram shown in FIG. 3, and in particular, showing a substantially continuous, positive-polarity phase current signal in FIG. 4E.

As described above, during normal operation, power switch 34 is turned ON and OFF by the phase commutation signal $\phi_A$ that is generated by controller 48 in the illustrated embodiment. As shown in FIG. 4A, in the illustrated embodiment, the phase commutation signal is inactive when it is at a logic low state, and is active when it assumes a logic high state.

Figure 4B:
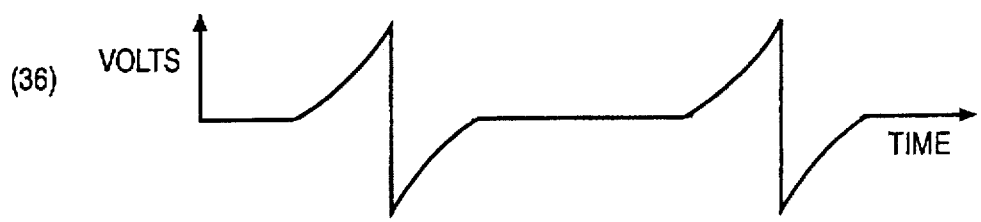

When switch 34 is "ON", current flows from the positive bus of the power supply, enters the dotted terminal of primary coil 30, flows through switch 34, and finally is sunk to the ground node via resistive element 38. When switch 34 is turned "OFF", the energy in primary coil 30 is transferred to or coupled to the secondary coil 32 by fairly well understood phenomena related to magnetic flux coupling. Accordingly, as is well-known, current then flows in the opposite direction (i.e., from the dotted terminal of coil 32 to the power supply). Thus, when the switch 34 is initially turned "OFF", current flows from the ground node, through resistive element 38 through common node 36, through diode 40, and finally through secondary coil 32 to the positive bus of the power supply. FIG. 4B shows the voltage signal developed at common node 36 due to the current first flowing through primary coil 30 when the phase commutation signal is active, and, the subsequent current flow through diode 40, and secondary coil 32 when the phase commutation signal becomes inactive, which results in a negative-polarity signal at node 36.

Figure 4C:
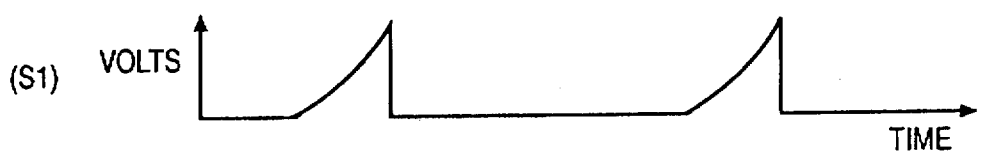
Figure 4D:

To obtain a continuous and positive polarity phase signal $i_A$, amplifiers 42, and 44 are used to process the voltage developed across resistive element 38. In particular, FIG. 4C shows first signal $S_1$ generated by non-inverting amplifier 42, while FIG. 4D shows second signal $S_2$ generated by inverting amplifier 44. Analog switch 46, which is controlled by the phase commutation signal $\phi_A$, is used to toggle between the two amplifier outputs $S_1$, and $S_2$, depending on the condition of the power switch 34. When switch 34 is "ON", (i.e., the active state), the output of non-inverting amplifier 42 is selected by the analog switch to be used as the switch output to generate the phase current signal. When the power switch is controlled to be "OFF", the output of inverting amplifier 44, by way of analog switch 46, is then used as the phase current signal.

Figure 4E:

The composite signal, shown in FIG. 4E, is the time-multiplexed addition of the two graphs shown in FIGS. 4C, and 4D. Thus, a continuous and positive polarity phase current signal $i_A$ is always available to controller 48 for purposes of control and protection. Such control is improved because information regarding the magnitude of the current through winding 28 is continuously available.

The preceding description is exemplary rather than limiting in nature. A preferred embodiment of this invention has been disclosed to enable one skilled in the art to practice the invention. Variations and modifications are possible without departing from the purview and spirit of this invention; the scope of which is limited only by the appended claims.

I claim:

1. An apparatus for generating a phase current signal representative of a phase current flowing through a bifilar phase winding having a primary coil and a secondary coil, said apparatus comprising:

means for generating a first signal indicative of a primary coil current;

means for generating a second signal indicative of a secondary coil current; and means for generating said phase current signal using said first signal and said second signal, wherein said phase current signal generating means is configurable to generate said phase current signal of a continuously positive polarity to thereby provide for improved phase commutation of a motor.

2. The apparatus of claim 1 further including energizing switch means for energizing said phase winding, said energizing switch means having a first terminal, a second terminal, and a control terminal wherein said first terminal is connected to said primary coil, said second terminal is connected to a common node, and said control terminal is responsive to a phase commutation signal for connecting said primary coil to said common node, wherein a first end of said primary coil, opposite the end connected to said first switch terminal is connected to a positive bus of a power supply.

3. An apparatus for generating a phase current signal representative of a phase current flowing through a bifilar phase winding having a primary coil and a secondary coil, said apparatus comprising:

means for generating a first signal indicative of a primary coil current;

means for generating a second signal indicative of a secondary coil current; and means for generating said phase current signal using said first signal and said second signal, wherein said phase current signal generating means is configurable to generate said phase current signal of a continuously positive polarity to thereby provide for improved phase commutation of a motor, and wherein said first signal generating means includes a resistive element, and a noninverting amplifier, said resistive element being connected between a common node and a ground node, said common node receiving said primary coil current when said primary coil is energized, said non-inverting amplifier including an input terminal connected to said common node, and an output terminal for producing said first signal, said output terminal of said non-inverting amplifier being connected to said phase current signal generating means.

4. An apparatus for generating a phase current signal representative of a phase current flowing through a bifilar phase winding having a primary coil and a secondary coil, said apparatus comprising:

means for generating a first signal indicative of a primary coil current;

means for generating a second signal indicative of a secondary coil current; and means for generating said phase current signal using said first signal and said second signal, wherein said phase current signal generating means is configurable to generate said phase current signal of a continuously positive polarity to thereby provide for improved phase commutation of a motor, and wherein said second signal generating means includes a resistive element, and an inverting amplifier, said resistive element being connected between a common node and a ground node, said common node being connected to said secondary coil by a diode, said inverting amplifier including an input terminal connected to said common node, and an output terminal for generating said second signal, said output terminal of said inverting amplifier being connected to said phase current signal generating means.

5. The apparatus of claim 1 wherein said phase signal generating means includes an analog switch for selecting said first signal to be output as said phase current signal when a phase commutation signal is in an active state, and for selecting said second signal to be output as said phase current signal when said phase current commutation signal is in an inactive state, said phase commutation signal, when active, corresponding to an energized primary coil.

6. An apparatus for generating a phase current signal representative of a phase current through a bifilar phase winding of a motor wherein said phase winding includes a primary coil and a secondary coil connected at respective first ends to a first power supply, said apparatus comprising:

an energizing switch having a first terminal, a second terminal, and a control terminal wherein said first terminal is connected to a second end of said primary coil, said second terminal is connected to a common node, and said control terminal is responsive to a phase commutation signal for connecting said primary coil to said common node to thereby allow current flow in said primary coil;

said secondary coil being in electrical communication with said common node to permit current to flow through said secondary coil to said first power supply;

a resistive element coupled between said common node and a ground node;

a non-inverting amplifier having an input terminal connected to said common node, and an output terminal for generating a first signal representative of a primary coil current;

an inverting amplifier having an input terminal connected to said common node, and an output terminal for generating a second signal representative of a secondary coil current;

an analog switch configurable to switch one of said first signal and said second signal to an output terminal thereof according to said phase commutation signal to generate said phase current signal of continuously positive polarity.

7. The apparatus of claim 6 further comprising a diode having an anode and a cathode wherein said cathode is connected to a second end of said secondary coil and said anode is connected to said common node to thereby provide for secondary coil current.

8. The apparatus of claim 6 wherein said resistive element is operative to generate a bipolar phase current signal corresponding to a magnitude and polarity of said phase current through said phase winding.

9. The apparatus of claim 6 wherein said output terminal of said analog switch outputs said first signal when said phase commutation signal is active and further outputs said second signal when said phase commutation signal is inactive.

10. A switched reluctance motor (SRM) comprising:

a stator having a plurality of poles wherein said poles have respective distal ends thereof terminating at a central bore;

a bifilar phase winding associated with a pair of diametrically opposite ones of said plurality of stator poles, said bifilar phase winding including a primary coil and a secondary coil each having respective first and second ends thereof wherein said respective first ends are connected to a first power supply;

a rotor disposed for rotation in said central bore;

an energizing switch having a first terminal, a second terminal, and a control terminal wherein said first terminal is connected to said second end of said primary coil, said second terminal is connected to a common node, and said control terminal is responsive to a phase commutation signal for connecting said primary coil to said common node to thereby allow current flow in said primary coil;

said secondary coil being in electrical communication with said common node so as to permit current flow through said secondary coil;

a resistive element coupled between said common node and a ground node;

a non-inverting amplifier having an input terminal connected to said common node and an output terminal for generating a first signal representative of a primary coil current;

an inverting amplifier having an input terminal connected to said common node and an output terminal for generating a second signal representative of a secondary coil current; and an analog switch for switching one of said first signal and said second signal to an output terminal thereof according to said phase commutation signal, said phase current signal being of continuously positive polarity.

11. The SRM of claim 10 further including a diode having a cathode and an anode wherein said cathode is connected to said second end of said secondary coil and said anode is connected to said common node to thereby provide for secondary coil current.

12. The SRM of claim 10 wherein said energizing switch is a field effect transistor.

* * * * *